US009380533B2

(12) United States Patent
Chung et al.

(10) Patent No.: US 9,380,533 B2
(45) Date of Patent: *Jun. 28, 2016

(54) METHOD AND APPARATUS FOR SUPPORTING CARRIER AGGREGATION

(71) Applicant: LG ELECTRONICS INC., Seoul (KR)

(72) Inventors: Jae Hoon Chung, Anyang-si (KR); Yeong Hyeon Kwon, Anyang-si (KR); Seung Hee Han, Anyang-si (KR); So Yeon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/797,913

(22) Filed: Jul. 13, 2015

(65) Prior Publication Data

US 2015/0327171 A1    Nov. 12, 2015

Related U.S. Application Data

(63) Continuation of application No. 14/329,113, filed on Jul. 11, 2014, now Pat. No. 9,155,044, which is a
(Continued)

(51) Int. Cl.
*H04W 52/02* (2009.01)
*H04W 72/04* (2009.01)
(Continued)

(52) U.S. Cl.
CPC ........... *H04W 52/0216* (2013.01); *H04L 5/001* (2013.01); *H04L 5/0035* (2013.01); *H04L 5/0053* (2013.01); *H04L 5/0098* (2013.01);
(Continued)

(58) Field of Classification Search
None
See application file for complete search history.

(56) References Cited

U.S. PATENT DOCUMENTS

| 8,359,039 B2 | 1/2013 | McBeath et al. |
| 2008/0089281 A1 | 4/2008 | Yoon et al. |
| 2008/0186892 A1 | 8/2008 | Damnjanovic |

(Continued)

FOREIGN PATENT DOCUMENTS

| CN | 101360106 | 2/2009 |
| CN | 101361298 | 2/2009 |

(Continued)

OTHER PUBLICATIONS

Zte, "Downlink control structure for LTE-A," 3GPP TSG-RAN WG1 meeting #56, R1-090628, Feb. 2009, 5 pages.

(Continued)

*Primary Examiner* — Hassan Kizou
*Assistant Examiner* — Hashim Bhatti
(74) *Attorney, Agent, or Firm* — Lee, Hong, Degerman, Kang & Walmey

(57) ABSTRACT

The present invention relates to a method and to an apparatus for supporting carrier aggregation. More particularly, the present invention relates to a method for enabling user equipment to receive a signal from a base station in a wireless communication system which supports carrier aggregation, wherein said the method comprises the steps of: setting a first component carrier to a paused state; receiving state change information for the first component carrier via the second component carrier during the paused state of the first component carrier; and monitoring a control channel via the first component carrier if the state change information indicates a predetermined value. The present invention also relates to an apparatus for the method.

14 Claims, 14 Drawing Sheets

Related U.S. Application Data continuation of application No. 13/256,924, filed as application No. PCT/KR2010/001611 on Mar. 16, 2010, now Pat. No. 8,811,284.

(60) Provisional application No. 61/160,691, filed on Mar. 16, 2009, provisional application No. 61/290,488, filed on Dec. 28, 2009.

(51) Int. Cl.
  *H04W 76/04* (2009.01)
  *H04L 5/00* (2006.01)

(52) U.S. Cl.
  CPC .......... *H04W 72/042* (2013.01); *H04W 76/048* (2013.01)

(56) References Cited

U.S. PATENT DOCUMENTS

| | | | |
|---|---|---|---|
| 2009/0028117 A1 | 1/2009 | Goulet et al. | |
| 2009/0055703 A1 | 2/2009 | Kim et al. | |
| 2009/0238105 A1 | 9/2009 | Wu et al. | |
| 2009/0316575 A1* | 12/2009 | Gholmieh | H04W 76/048 370/225 |
| 2010/0098012 A1 | 4/2010 | Bala et al. | |
| 2010/0227569 A1* | 9/2010 | Bala | H04L 5/0007 455/73 |
| 2011/0002281 A1 | 1/2011 | Terry et al. | |
| 2012/0002635 A1* | 1/2012 | Chung | H04W 76/048 370/329 |
| 2012/0044847 A1* | 2/2012 | Chang | H04W 76/048 370/311 |
| 2012/0113831 A1* | 5/2012 | Pelletier | H04L 5/0058 370/252 |
| 2012/0113941 A1* | 5/2012 | Chung | H04W 72/1289 370/329 |
| 2015/0092637 A1* | 4/2015 | Yang | H04B 7/2656 370/296 |

FOREIGN PATENT DOCUMENTS

| | | |
|---|---|---|
| GB | 2439367 | 12/2007 |
| KR | 10-0596909 | 7/2006 |
| KR | 10-0696222 | 3/2007 |

OTHER PUBLICATIONS

Ericsson, "Carrier aggregation in LTE-Advanced", R1-082468, TSG-RAN WG1 #53bis, Jun. 2008, 6 pages.
CMCC, "Multicarrier Operation and PDCCH design of Carrier Aggregation", R1-084333, 3GPP TSG RAN WG1 meeting #55, Nov. 2008, 4 pages.
The State Intellectual Property Office of the People's Republic of China Application Serial No. 201080012395.7 Office Action dated Mar. 21, 2014, 5 pages.

* cited by examiner

METHOD AND APPARATUS FOR SUPPORTING CARRIER AGGREGATION

CROSS-REFERENCE TO RELATED APPLICATIONS

This application is a continuation of U.S. patent application Ser. No. 14/329,113, filed on Jul. 11, 2014, now U.S. Pat. No. 9,155,044, which is a continuation of U.S. patent application Ser. No. 13/256,924, filed on Sep. 15, 2011, now U.S. Pat. No. 8,811,284, which is the National Stage filing under 35 U.S.C. 371 of International Application No. PCT/KR2010/001611, filed on Mar. 16, 2010, which claims the benefit of U.S. Provisional Application Nos. 61/290,488, filed on Dec. 28, 2009, and 61/160,691, filed on Mar. 16, 2009, the contents of which are all hereby incorporated by reference herein in their entirety.

TECHNICAL FIELD

The present invention relates to a wireless communication system, and more particularly, to a method and apparatus used in a wireless communication system supporting carrier aggregation.

BACKGROUND ART

Wireless communication systems have been widely developed to provide a variety of types of communication services such as voice and data. Generally, a wireless communication system is a multiple access system capable of supporting communications with multiple users by sharing available system resources (bandwidth, transmission power, etc.). Examples of the multiple access system include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, a Multi Carrier Frequency Division Multiple access (MC-FDMA) system, and the like.

DETAILED DESCRIPTION OF THE INVENTION

Technical Problems

The present invention provides a method and apparatus for supporting carrier aggregation in a wireless communication system. Specifically, the present invention provides a method and apparatus for efficiently operating a Coordinated Multi-Point (COMP) in a carrier aggregation system. Also, the present invention provides a method and apparatus for efficiently managing power of a user equipment in a carrier aggregation system.

The technical objects to be achieved by the present invention are not limited to the above-mentioned technical objects, and other technical problems not mentioned above can be clearly derived and understood by one skilled in the art from the embodiments of the present invention which will be described hereinbelow.

Means for Solving Problems

In one aspect of the present invention, provided herein is a signal reception method of a user equipment from a base station in a wireless communication system supporting carrier aggregation, including setting a first component carrier to an idle state, receiving state change information about the first component carrier through a second component carrier while the first component carrier is in the idle state, and if the state change information indicates a predetermined value, monitoring a control channel through the first component carrier.

In another aspect of the present invention, provided herein is a user equipment, including a Radio Frequency (RF) module for transmitting and receiving radio signals to and from a base station through a plurality of component carriers, and a processor for processing signals received from the RF module, wherein the processor sets a first component carrier to an idle state, receives state change information about a second component carrier through the second component carrier while the first component carrier is in the idle state, and if the state change information indicates a predetermined value, monitors a control channel through the first component carrier.

The step of setting a first component carrier to an idle state may include being triggered when the second component carrier is Discontinuous Reception (DRX) mode. The step of setting a first component carrier to an idle state may include being triggered in a sleep state of the DRX mode.

The state change information may be received when the second component carrier operates as Discontinuous Reception (DRX) mode. The state change information may be received through a Physical Downlink Control Channel (PDCCH) of the second component carrier. The state change information may be confirmed through paging indication information or a paging message.

The user equipment may be in a Radio Resource Control (RRC)_IDLE state.

Advantageous Effects

According to the embodiments of the present invention, carrier aggregation can be efficiently implemented in a wireless communication system. Specifically, a CoMP can be efficiently implemented in a carrier aggregation system and power of a user equipment can be efficiently managed.

The effects of the present invention are not limited to the above-mentioned effects, and other effects not mentioned above can be clearly derived and understood by one skilled in the art from the following description of the embodiments of the present invention.

BRIEF DESCRIPTION OF THE DRAWINGS

The accompanying drawings, which are included to provide a further understanding of the invention and constitute a part of the detailed description, illustrate embodiments of the invention and together with the description serve to explain the principles of the invention.

BEST MODE FOR CARRYING OUT THE INVENTION

The constructions, operations, and other features of the present invention will be easily understood by the embodiments of the present invention which are described with reference to the attached drawings. Although the following embodiments are described focusing on the case where the technical features of the present invention are applied to a 3GPP system, the present invention is not limited thereto.

Figure 1:
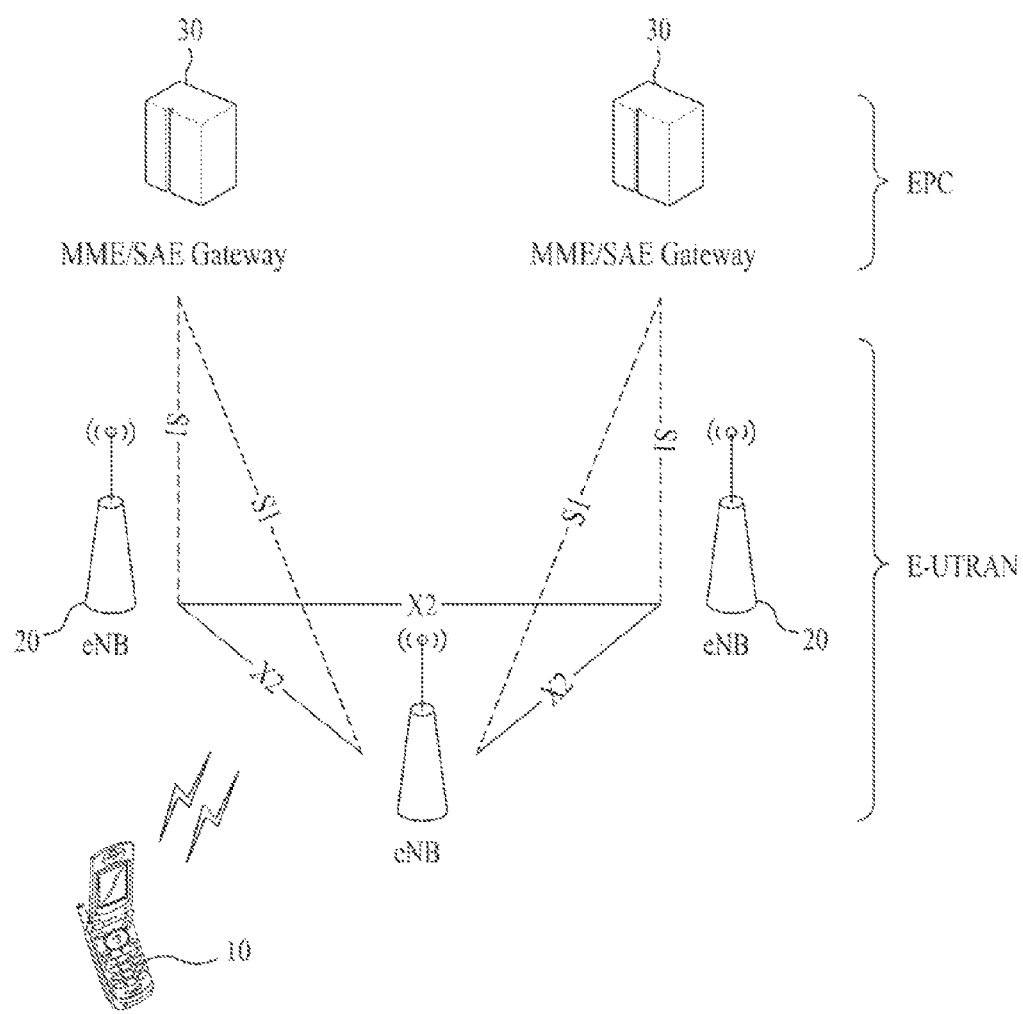
FIG. 1 illustrates a network structure of an Evolved Universal Mobile Telecommunication System (E-UMTS)

FIG. 1 illustrates a network structure of an E-UMTS. The E-UMTS is also referred to as an LTE system. The communication network is widely deployed to provide a variety of communication services such as voice and packet data.

Referring to FIG. 1, the E-UMTS network includes an Evolved Universal Terrestrial Radio Access Network (E-UTRAN), an Evolved Packet Core (EPC), and one or more User Equipments (UEs). The E-UTRAN may include one or more evolved NodeBs (eNBs) 20, and a plurality of UEs 10 may be located in one cell. One or more E-UTRAN Mobility Management Entity/System Architecture Evolution (MME/SAE) gateways 30 may be positioned at the end of the network and may be connected to an external network. In this specification, downlink refers to communication from the eNB 20 to the UE 10, and uplink refers to communication from the UE to an eNB.

The UE 10 is a communication equipment carried by a user and may also be referred to as a Mobile Station (MS), a User Terminal (UT), a Subscriber Station (SS), or a wireless device. The eNB 20 is generally a fixed station communicating with the UE 10 and may also be referred to as an Access Point (AP). The eNB 20 provides end points of a user plane and a control plane to the UE 10. One eNB 20 may be deployed per cell. An interface for transmitting user traffic or control traffic may be used between the eNBs 20. The MME/SAE gateway 30 provides an end point of a session and mobility management function to the UE 10. The eNB 20 and MME/SAE gateway 30 may be connected via an S1 interface.

The MME provides various functions, including distribution of paging messages to the eNBs 20, security control, idle state mobility control, SAE bearer control, and encryption and integrity protection of Non-Access Stratum (NAS) signaling. An SAE gateway host provides a variety of functions, including termination of a plane packet and user plane switching for supporting mobility of the UE 10. The MME/SAE gateway 30 will be referred to herein simply as a "gateway". However, the MME/SAE gateway 30 includes both an MME and an SAE gateway.

A plurality of nodes may be connected between the eNB 20 and the gateway 30 via the S1 interface. The eNBs 20 may be connected to each other via an X2 interface and neighboring eNBs may have a meshed network structure that has the X2 interface.

Figure 2:
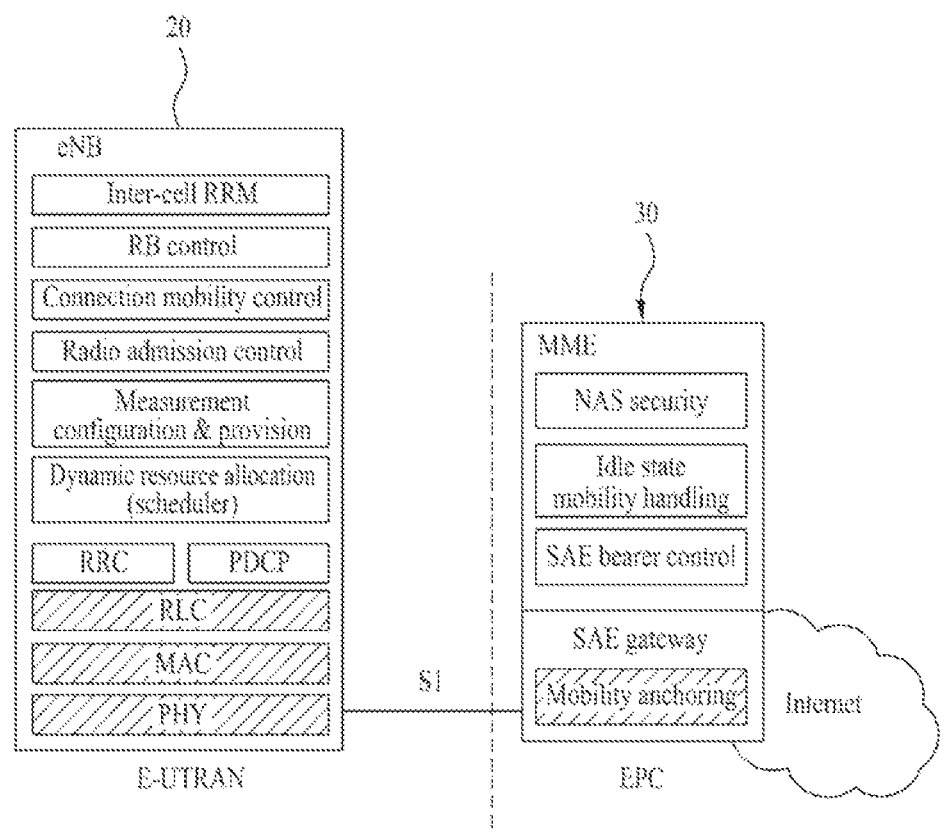
FIG. 2 illustrates the architecture of an E-UTRAN and a gateway.

FIG. 2 illustrates the architecture of a typical E-UTRAN and a typical gateway 30. Referring to FIG. 2, the eNB 20 may perform functions such as selection for the gateway 30, routing toward the gateway during a Radio Resource Control (RRC) activation, scheduling and transmitting paging messages, scheduling and transmitting Broadcast Channel (BCCH) information, dynamic resource allocation to the UEs 10 in both uplink (UL) and downlink (DL), configuration and provision of eNB measurements, Radio Bearer (RB) control, Radio Admission Control (RAC), and connection mobility control in an LTE_ACTIVE state. The gateway 30 may perform functions such as paging origination, LTE_IDLE state handling, user plane encryption, SAE bearer control, and encryption and integrity protection of NAS signaling.

Figure 3:
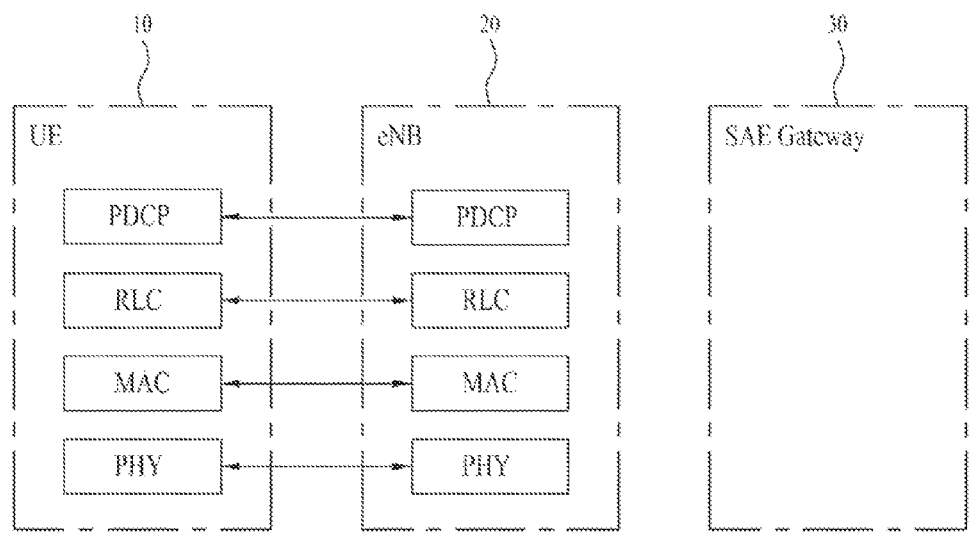
FIG. 3 and FIG. 4 illustrate user/control plane protocol for E-UMTS.
Figure 4:
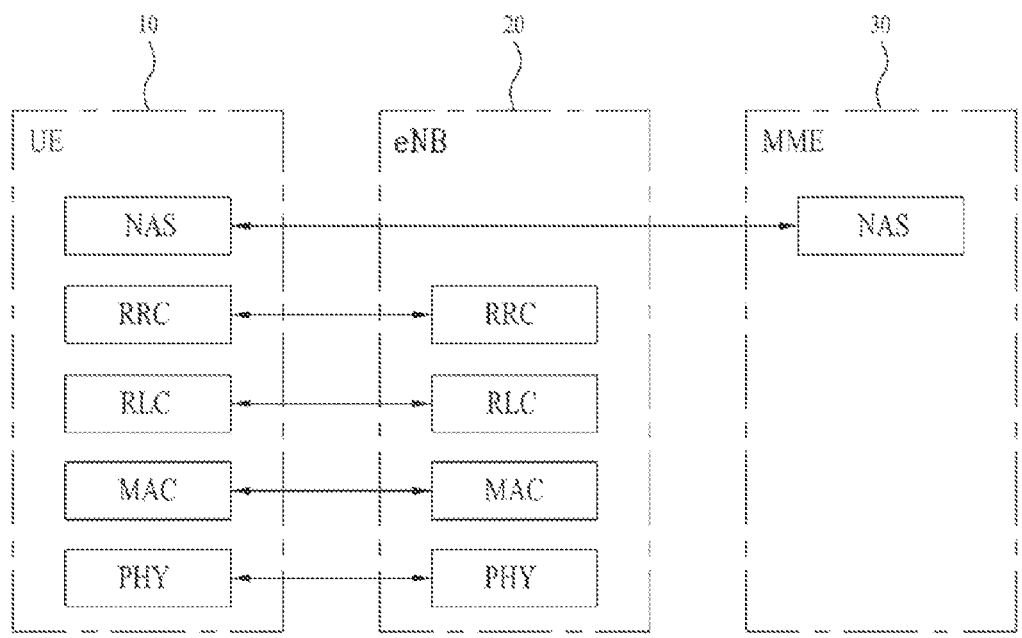

FIG. 3 and FIG. 4 illustrate user-plane and control-plane protocol stacks for an E-UMTS. Referring to FIG. 3 and FIG. 4, protocol layers may be divided into a first layer (L1), a second layer (L2) and a third layer (L3) based upon three lower layers of an Open System Interconnection (OSI) standard model that is well-known in the art of communication systems.

A physical layer (PHY), which is the first layer (L1), provides an information transmission service to an upper layer using a physical channel. The physical layer is connected to a Medium Access Control (MAC) layer located at an upper level through a transport channel. Data is transferred between the MAC layer and the physical layer via the transport channel. Data is also transferred via a physical channel between a physical layer of a transmission side and a physical layer of a reception side.

A MAC layer of the second layer (L2) provides services to a Radio Link Control (RLC) layer of an upper layer via a logical channel. The RLC layer of the second layer (L2) supports reliable data transmission. If the MAC layer performs an RLC function, the RLC layer is included in a functional block of the MAC layer. A Packet Data Convergence Protocol (PDCP) layer of the second layer (L2) performs a header compression function. The header compression function allows efficient transmission of Internet protocol (IP) packet, such as an IPv4 or IPv6 packet through a radio interface that has a relatively narrow bandwidth.

A radio resource control (RRC) layer located at the lowest portion of the third layer (L3) is defined only in the control plane and controls logical channels, transport channels and the physical channels in relation to the configuration, reconfiguration, and release of radio bearers (RBs). An RB refers to a service provided by the second layer (L2) for data transmission between the UE 10 and the E-UTRAN.

Referring to FIG. 3, the RLC and MAC layers are terminated in an eNB 20 and may perform functions such as scheduling, Automatic Repeat Request (ARQ), and Hybrid Automatic Repeat Request (HARQ). The PDCP layer is terminated in the eNB 20 and may perform functions such as header compression, integrity protection, and encryption.

Referring to FIG. 4, the RLC and MAC layers are terminated in the eNB 20 and perform the same functions as in the control plane. As illustrated in FIG. 3, the RRC layer is terminated in the eNB 20 and may perform functions such as broadcasting, paging, RRC connection management, RB control, mobility function, and UE measurement reporting and control. As illustrated in FIG. 2(*c*), a NAS control protocol is terminated in an MME of a gateway 30 and may perform functions such as an SAE bearer management, authentication, LTE_IDLE mobility handling, paging origination in an LTE_IDLE state, and security control for signaling between the gateway and the UE 10.

The NAS control protocol may use three different states. An LTE-DETACHED is used when there is no RRC entity. An LTE_IDLE state is used when there is no RRC connection while storing minimal information about the UE 10. An LTE_ACTIVE state is used when an RRC state is established. The RRC state may further be divided into RRC_IDLE and RRC_CONNECTED.

In an RRC_IDLE state, the UE 10 performs Discontinuous Reception (DRX) set by the NAS using an ID which is uniquely allocated in a tracking area. In other words, the UE 10 may receive broadcasts of system information and paging information by monitoring paging signals at a specific paging occasion of every UE-specific paging DRX cycle. No RRC context is stored in the eNB in the RRC-IDLE state.

In an RRC_CONNECTED state, it is possible for the UE 10 to transmit and/or receive data to/from the eNB using an E-UTRAN RRC connection and a context in the E-UTRAN. Furthermore, the UE 10 can report channel quality information and feedback information to the eNB. In the RRC_CONNECTED state, the E-UTRAN knows a cell to which the UE 10 belongs. Therefore, the network may transmit and/or receive data to/from the UE 10, control mobility such as handover of the UE, and perform cell measurements for a neighboring cell.

Figure 5:
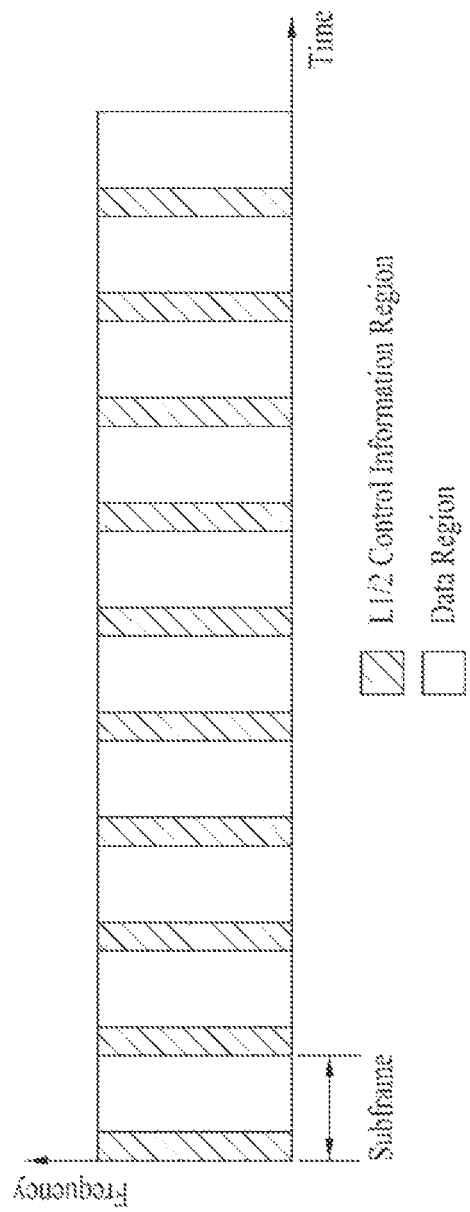
FIG. 5 illustrates a radio frame structure used in an E-UMTS system.

FIG. 5 illustrates a radio frame structure used in an E-UMTS system.

Referring to FIG. 5, the E-UMTS system uses a 10 ms radio frame and one radio frame includes 10 subframes. One subframe includes two consecutive slots, each of which has a length of 0.5 ms. In addition, one subframe includes a plurality of symbols (e.g. OFDM symbols and SC-FDMA symbols). One subframe includes a plurality of resource blocks, each of which includes a plurality of symbols and a plurality of subcarriers. Some (e.g. the first symbol) of the plurality of symbols constituting the subframe may be used to transmit L1/L2 control information. A physical channel (e.g. Physical Downlink Control Channel (PDCCH)) for transmitting the L1/L2 control information includes multiple subframes on a time axis and multiple subcarriers on a frequency axis.

Figure 6:
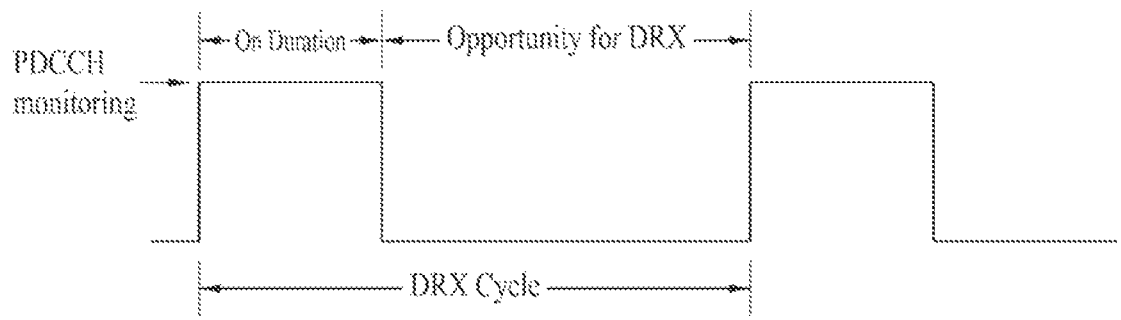
FIG. 6 and FIG. 7 illustrate discontinuous Reception (DRX) and a paging process.

FIG. 6 illustrates DRX defined in LTE. A UE performs DRX in an RRC_IDLE state to reduce power dissipation. Referring to FIG. 6, a DRX cycle (or duty cycle) includes an on duration and an opportunity for DRX. The UE monitors a PDCCH during the on duration and does not monitor the PDCCH during the opportunity for DRX. In other words, the UE repeats sleep/awake according to a DRX pattern, thereby reducing unnecessary power consumption.

Figure 7:
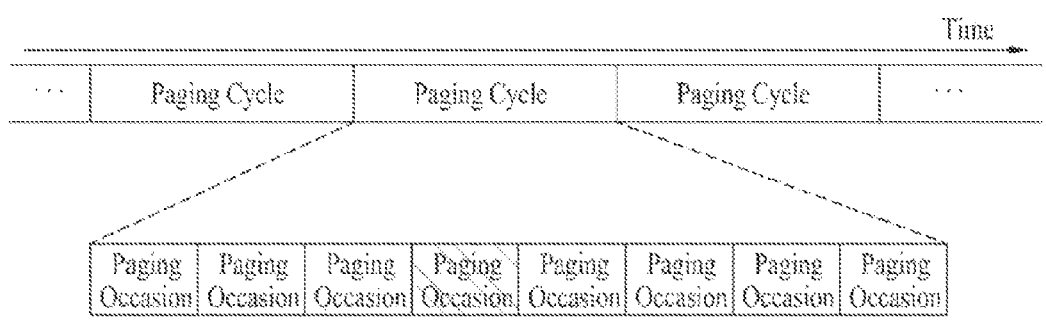

FIG. 7 illustrates paging channel transmission. Upon receiving a paging message, a UE may perform DRX. Referring to FIG. 7, a network may configure a plurality of paging occasions at every paging cycle and the UE may obtain the paging message by receiving only a corresponding paging occasion. The UE receives no paging channel except for a corresponding paging occasion. One paging occasion corresponds to one Transmission Time Interval (TTI). Specifically, the UE awakes at a corresponding paging occasion to receive a PDCCH. Upon receiving paging indication information (e.g. Paging-RNTI (P-RNTI)) through the PDCCH, the UE receives a radio resource indicated by the PDCCH. An actual paging message is transmitted through the radio resource. The UE confirms whether there is an ID thereof, i.e. an ID such as an International Mobile Subscriber Identity (IMSI) allocated thereto, by receiving the paging message. If there is a corresponding ID, the UE informs an upper stage of arrival of the paging message.

Figure 8:
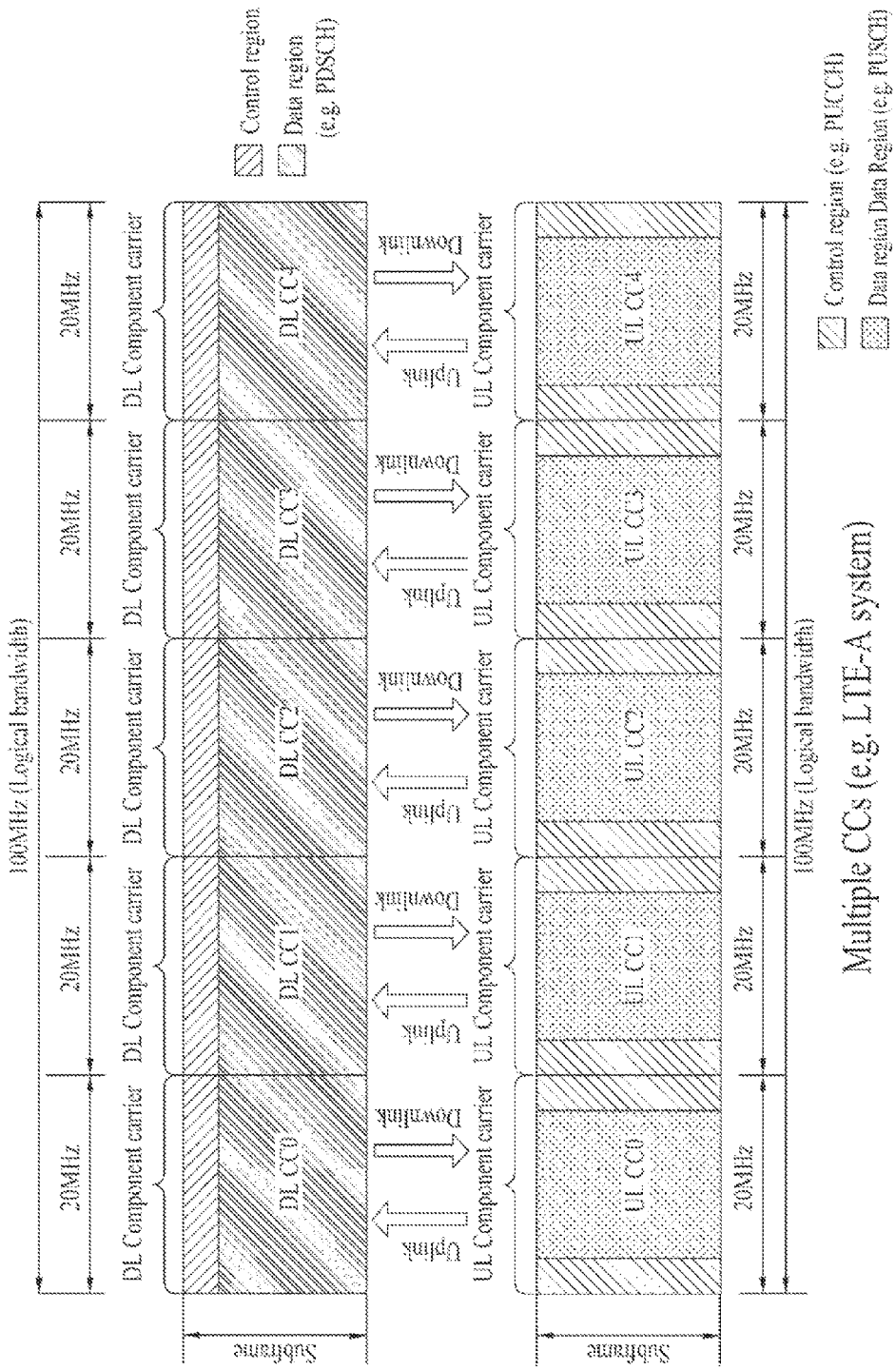
FIG. 8 illustrates a communication method in a carrier aggregation circumstance.

FIG. 8 illustrates an example of performing communication in a carrier aggregation circumstance. FIG. 8 may correspond to an example of communication in an LTE-Advanced (LTE-A) system. The LTE-A system uses a carrier aggregation (or bandwidth aggregation) technology which uses a wider UL/DL bandwidth by aggregating a plurality of UL/DL frequency blocks in order to employ a wider frequency band. Each frequency block is transmitted using a Component Carrier (CC). The CC may refer to a frequency block for carrier aggregation or a center carrier of a frequency block according to contexts and they are changeably used.

Referring to FIG. 8, five 20 MHz CCs in UL/DL are aggregated to support a bandwidth of 100 MHz. The respective CCs may be or may not be adjacent to each other in a frequency domain. For convenience, FIG. 8 shows the case where a bandwidth of a UL CC and a bandwidth of a DL CC are the same and symmetrical. However, bandwidths of the respective CCs may be independently determined. For example, bandwidths of the UL CCs may be configured as 5 MHz (UL CC0)+20 MHz (UL CC1)+20 MHz (UL CC2)+20 MHz (UL CC3)+5 MHz (UL CC4). While UL signals and DL signals are transmitted through CCs which are mapped one by one, CCs through which actual signals are transmitted may vary according to network setting or signal type. For example, a CC through which a scheduling command is transmitted and a CC through which an actual signal is transmitted may be different. Furthermore, UL/DL control information may be transmitted through a specific UL/DL CC irrespective of whether mapping has been performed between CCs.

Embodiment 1

UE-Specific CC Allocation for Carrier Aggregation

Figure 9:
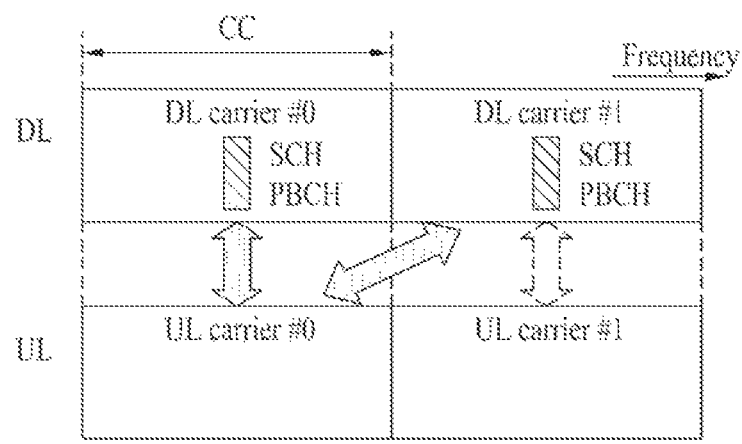
FIG. 9 illustrates CC allocation according to an embodiment of the present invention.

FIG. 9 illustrates an example of configuring multiple CCs according to an embodiment of the present invention. Asymmetric carrier aggregation in which the number of UL CCs is different from the number of DL CCs may be configured. In other words, even if a system band is comprised of N CCs, a frequency band which can be used by a specific UE may be limited to M (<N) CCs. The asymmetric carrier aggregation may be generated due to UE capabilities or limitation of available frequency bands or may be intentionally generated by network configuration.

Referring to FIG. 9, it is assumed that an eNB supports symmetric carrier aggregation in which DL CC#0 is linked to UL CC#0 and DL CC#1 is linked to UL CC#1. Then the eNB (or cell) will broadcast a support for 2 DL CCs and 2 UL CCs and a DL CC and UL CC linkage through system information. Meanwhile, if the numbers of CCs which can be accessed by a UE are asymmetric in UL/DL, the eNB may asymmetrically allocate DL CCs and UL CCs, for example, two DL CCs and one UL CC to the corresponding UE.

For convenience, a CC allocated to the UE is referred to as an active CC. To receive control information (e.g. scheduling information) from the eNB, the UE may monitor an active CC, measure channel quality of the active DL CC, and report the measured result to the eNB. The UE may transmit sounding reference signals and data/control channels to a UL through an active UL CC. Meanwhile, the active UL CC may denote an on-demand candidate for UL transmission of the sounding reference signals and data/control channels.

It is apparent that the embodiments of the present invention are applicable to M (<N) CCs even though a description of N CCs is given hereinbelow. Moreover, the embodiments of the present invention may be applied to each of L CC groups which are divided from N (or M) CCs allocated to the UE. Various parameters for carrier aggregation may be set cell-specifically, UE group-specifically, or UE-specifically.

Semi-Static CC Allocation Using RRC Signaling

A cell search and initial access process may be performed in a single CC state. Then, a UE may identify information about cell-specific DL/UL CC configuration and linkage of the DL/UL CC in the single CC state. Thereafter, the cell-specific DL/UL CC configuration and linkage of the DL/UL CC may be changed by UE-specific CC allocation signaling.

UE-specific CC allocation may be signaled semi-statically through RRC signaling in consideration of CC support capabilities of the UE, resource demands, load balancing, etc. The UE-specific RRC signaling may include information about an anchor (or primary) CC.

Dynamic CC Allocation Using L1/L2 Signaling

L1/L2 signaling may be used to change CC configuration (e.g. DL-UL linkage or the number of CCs) dynamically or semi-dynamically. Moreover, the L1/L2 signaling may be used to change CC configuration performed through RRC signaling. The L1/L2 signaling may also change CC configuration within a CC set. For example, if multiple DL CCs are needed to support high data rate, an indicator indicating that monitoring for additional DL CCs should be started may be transmitted by the L1/L2 control signaling. Meanwhile, if a less number of DL CCs than an allocated number of CCs needs to be monitored, an indicator indicating that monitoring for some DL CCs should be stopped may be transmitted through the L1/l2 control signaling. The L1/L2 signaling may be transmitted through a PDCCH. For convenience, such a PDCCH is referred to as a semi-dynamic triggering PDCCH or a prime PDCCH.

Embodiment 2

CoMP Scheme for Supporting Carrier Aggregation

Figure 10:
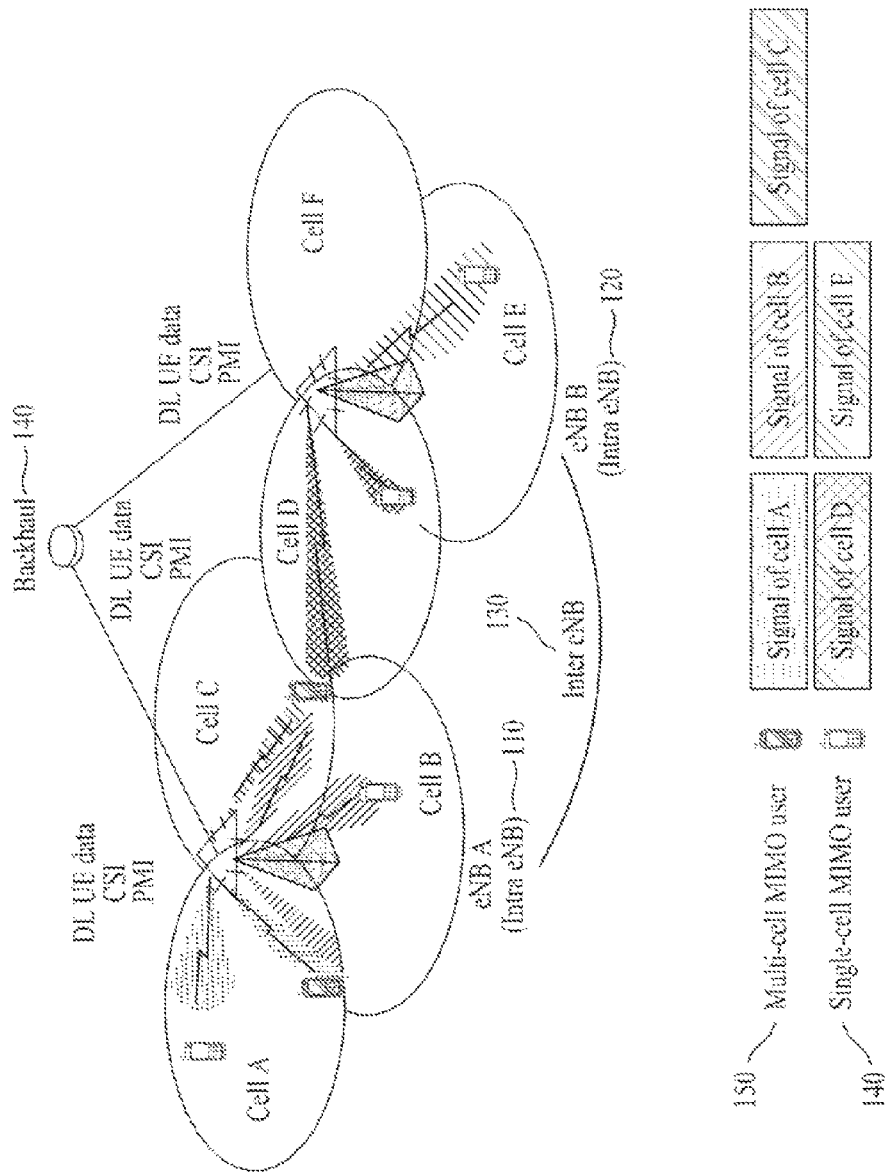
FIG. 10 and FIG. 11 illustrate the configuration of a CoMP according to an embodiment of the present invention.
Figure 11:
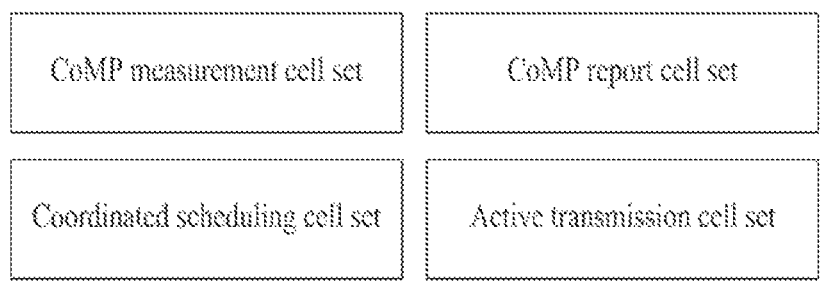

FIG. 10 and FIG. 11 illustrate an example of a Coordinated Multi-Point (CoMP) system. The CoMP system is a system for improving communication capabilities of a user at a cell boundary. If the CoMP system is applied, inter-cell interference can be reduced in a multi-cell environment. A CoMP scheme may be divided into a joint processing scheme of a coordinated MIMO type through data sharing and a coordinated scheduling scheme/beamforming scheme. In the CoMP system, UEs can commonly receive data from multi-cell eNBs. Meanwhile, each eNB can simultaneously support one or more UE using the same radio frequency resource. The eNB may perform a Space Division Multiple Access (SDMA) scheme based on a channel state.

Referring to FIG. 10, the CoMP system includes intra eNBs 120 and 130, an inter eNB 130, and UEs in a multi-cell environment. Cells of the same eNB may exchange information (e.g. data and channel state information) through an interface. Meanwhile, cells of different eNBs may exchange inter-cell information through a backhaul 140, etc. As illustrated in FIG. 10, a single-cell MIMO user 140 within a single cell may communicate with one serving eNB in one cell, and a multi-cell MIMO user 150 located at a cell boundary may communicate with a plurality of serving eNBs in multiple cells.

FIG. 11 illustrates a variety of cell sets for CoMP transmission. Referring to FIG. 11, the CoMP system may include a CoMP measurement cell set, a CoMP report cell set, a coordinated scheduling cell set, and an active transmission cell set. The CoMP measurement cell set includes Tx points (e.g. cells) in which signal/channel quality is measured by a corresponding UE. The CoMP report cell set includes Tx points (e.g. cells) in which signal/channel measurement results are reported by a corresponding UE. In other words, the corresponding UE reports signal/channel measurement results for cells within the CoMP report cell set to a serving Tx point (e.g. cell). The coordinated scheduling cell set includes Tx points (e.g. cells) which are used for coordinated scheduling or coordinated beamforming. The active transmission cell set includes Tx points (e.g. cells) to which a DL data channel is allocated. As an example, the active transmission cell set may include cells which are to share plural data during joint processing. The active transmission cell set may simply be referred to as an active set.

If the UE and eNB have carrier aggregation capabilities, DL CoMP transmission may be performed using multiple CCs. Hereinbelow, configuration of a cell set for CoMP transmission and operation of a DL CoMP in a carrier aggregation circumstance will be proposed.

CoMP Measurement Cell Set

A measurement cell for a DL CoMP may be configured cell-specifically or UE-specifically. Overhead caused by CC search or CC moving can be reduced by configuring a CoMP measurement cell set in consideration of CCs.

As a scheme for configuring the CoMP measurement cell set, indexes for one or more DL CCs which are measurement targets per target cell may be signaled to the UE. Further, for all or some cells within the CoMP measurement cell set, one or more DL CCs which are measurement targets in terms of a cell to which a UE performing a DL CoMP belongs may be commonly designated and may be transmitted to the UE. In addition, one or more DL CCS to be commonly measured in a CoMP cluster set, which is configured geographically (as a network level) irrespective of a cell in which a UE is located, may be fixedly designated and may be shared with the UE. DL CCs of measurement targets in the CoMP measurement cell set may be designated in units of cells, sub-groups, or CoMP measurement cell sets. For example, all or some cells within the CoMP measurement cell set may be divided into sub-groups and DL CCs may be designated in units of sub-groups.

Information about the CoMP measurement cell set may be signaled to UEs performing CoMP within a cell (together with cell information). For example, information about the CoMP measurement cell set, (e.g. target cells and DL CCs of the target cells), may be semi-statically transmitted to UEs through CoMP UE-specific RRC signaling or CoMP cell-specific RRC signaling. In this case, DL CCs of target cells which are to perform neighboring-cell measurement may be designated as anchor or primary DL CCs of target cells.

Meanwhile, UEs supporting only a single CC and UEs supporting carrier aggregation may be mixedly present within a cell. In this case, to configure the DL CoMP measurement cell set, a plurality of measurement DL CCs may be configured, and a UE having single-CC transmission capabilities may apply an inter-frequency measurement method by CC camping. However, in order to support more efficient measurements, one or a less number (N) of DL CCs among a CoMP measurement cell set, a CoMP cluster set, and a sub-group thereof may be designated as measurement target CCs.

Meanwhile, in consideration of report overhead and cell-specific characteristics of a measurement cell set, different CoMP schemes may be applied to each DL CC. A CoMP scheme for each DL CC may be configured UE-specifically, cell-specifically, or cell group-specifically.

CoMP Report Cell Set

The CoMP measurement cell set may be all configured as the CoMP report cell set. Alternatively, some cells/DL CCs in the CoMP measurement cell set may be designated UE-specifically or cell-specifically as the CoMP report cell set. In other words, measurement information of report target cells may be derived from all DL CCs of the CoMP measurement cell set or from some DL CCs in consideration of a specific purpose (report overhead, UE processing cost, etc.). If one DL CC is designated as a measurement target, the corresponding DL CC is designated as a report target DL CC. Meanwhile, measurement information obtained from measurement target DL CCs may be used for report by re-processing the measurement information as single effective measurement information with respect to each cell or sub-group. A sub-group includes one or more cells. Similarly, measurement information obtained from measurement target DL CCs may be used for report by re-processing the measurement information as single effective measurement information with respect to M (>1) DL CC groups.

When a UE transmits a CoMP measurement result to UL, a plurality of UL CCs may be configured in the corresponding UE. In this case, although report using the plurality of UL CCs may be basically performed, a report result may be transmitted through one or more UL CCs which are designated for CoMP feedback or configured as a primary UE for an additional purpose. If the amount of information to be fed back on a UL CC is greater than a symbol space of a PUCCH designed for legacy LTE or LTE-A, a PUSCH may be used for report transmission. In this case, modulation symbols for feedback information may be mapped to a physical (or virtual) PUSCH resource, and if data is previously present, data/control multiplexing may be performed. Furthermore, a MAC messaging scheme in which feedback information is constructed by a MAC PDU may be applied. Additionally, in order to avoid the feedback information from excessively increasing on specific UL CCs, a plurality of PUCCHs may be fed back on the corresponding multiple UL CCs. As an alternative method, if UL CCs used during CoMP measurement report are limited, a plurality of PUCCHs may be used on the limited UL CCs for feedback.

Coordinated Scheduling Cell Set

If coordinated scheduling or coordinated beamforming is applied to a UE, coordination for frequency bands, CCs or transmission PMIs in all neighboring cells may be performed in order to derive optimal transmission for data transmission from a serving cell. In this case, neighboring cells which are targets of coordinated scheduling or coordinated beamforming and/or DL CCs of the corresponding neighboring cells may be configured based on cell information and DL CC information of the aforementioned CoMP report cell set information (or CoMP measurement cell set information). Unlike this case, it may be assumed that the CoMP measurement cell set and/or CoMP report cell set is designated in consideration of target cells and DL CCs performing the coordinated scheduling or coordinated beamforming. Some or all target cells and DL CCs performing the coordinated scheduling or coordinated beamforming may be designated as the CoMP measurement cell set and/or CoMP report cell set. The coordinated scheduling or coordinated beamforming may be used by a part of all DL CCs configured to a corresponding UE. In this case, DL CCs which are measurement or report targets in the CoMP measurement cell set and/or CoMP report cell set may be limited to DL CCs to which a corresponding CoMP scheme is applied.

Active Transmission Cell Set

Joint processing of a DL CoMP may be implemented based on cell information and DL CC information designated by the CoMP measurement cell set and/or CoMP report cell set. If carrier aggregation is used, cells included in the active transmission cell set may be divided into sub-groups for transmission through different DL CCs according to the sub-groups. Meanwhile, one or more DL CCs to which a DL CoMP is applied in the active set or subgroups may be commonly configured.

As an alternative method, if a plurality of DL CCs is allocated to a UE, a DL CoMP transmission scheme may be independently applied according to each DL CC. For example, DL CCs to which joint processing is applied may be separately designated from DL CCs to which other types of DL CoMP schemes are applied. Specifically, joint processing and coordinated scheduling/beamforming may be differently applied according to a DL CC. In this case, a CoMP measurement cell set and/or a CoMP report cell set may be differently configured according to a DL CoMP transmission scheme. In more detail, individual CoMP schemes are distinguished according to DL CCs and thus the CoMP measurement cell set and/or the CoMP report cell set may be separately configured. Configuration in which a CoMP scheme is applied according to a DL CC may be UE-specific, cell-specific, or cell group-specific. If a DL CoMP transmission scheme is differently configured according to a DL CC, a CQI measurement reference signal for a CoMP may be differently configured from a demodulation reference signal. Furthermore, according to a CoMP transmission scheme, a handover process and measurements therefor per DL CC may be different. Alternatively, a scheme for allocating cell-specific DL CCs and/or UL CCs, (including both joint processing and coordinated scheduling), may be applied to UEs performing DL CoMP transmission. Unlike this method, a scheme for allocating DL CCs and/or UL CCs may be specifically applied in units of cell groups (e.g. CoMP cell clusters).

Embodiment 3

Operation of UE in RRC Idle State

If multiple CCs are configured in a wireless communication system supporting carrier aggregation, a method for setting active/idle states of a UE is described. For convenience of description, although an operation of the UE is explained for DL transmission, the same or similar method may be easily applied to UL transmission.

In this embodiment, active/idle states may correspond to RRC_CONNECTED/RRC_IDLE states or may be detailed states defined in RRC_IDLE state. According to contexts, these states may be changeably used. In this embodiment, the active/idle states may be referred to as active/inactive states or DRX entrance (setting)/quit (release). In this embodiment, DRX mode is a broad concept indicating discontinuous reception and includes LTE DRX mode. Namely, while the LTE DRX mode has a cyclic sleep/awake pattern, the DRX mode of the present embodiment may have a cyclic/non-cyclic sleep/awake pattern without restriction. Unless mentioned otherwise, the DRX mode in this embodiment is used as a broad concept. Meanwhile, if the active/idle states are defined as detailed states of the RRC_IDLE state, the active/idle states may correspond to awake/sleep of the DRX mode. Unless distinguished explicitly, the idle state and sleep are changeably used according to contexts.

As one example, the idle state in this embodiment may be defined as the same mode as the DRX mode of an LTE system. In other words, the idle state includes a pattern in which sleep/awake are cyclically repeated and a UE does not monitor PDCCH transmission in a sleep duration and may monitor PDCCH transmission in an awake duration (of specific DL CCs). As another example, the idle state may be defined as a state different from the DRX mode. Specifically, if the idle duration is set based on a timer, the sleep state may be continuously maintained without applying a sleep/awake pattern. That is, PDCCH transmission may not be monitored during all idle durations. In this case, a UE may not expect PDSCH transmission in idle/sleep durations. A transmission/reception operation of a physical channel or a physical signal for DL synchronization and UL synchronization may not be performed in the idle/sleep durations.

If types of DL CCs allocated to the UE are the same, the same power management scheme (e.g. DRX mode) may be performed according to each DL CC. For example, a power management scheme defined in LTE, (i.e. timer based DRX mode triggering, DRX pattern, paging message transmission, operation scheme within mode, etc.) may be applied according to a DL CC. However, if types of DL CCs allocated to the UE are different, different types of power management schemes may be applied.

For example, one or more DL CCs among DL CCs allocated to the UE may be configured as reference DL CCs (e.g. anchor or primary DL CCs) UE-specifically, UE group-specifically, or cell-specifically. In this case, different types of DRX modes may be configured with respect to reference DL CCs and non-reference DL CCs (e.g. non-anchor or non-primary DL CCs). As one example, timer expiration values for DRX mode triggering may be differently defined with respect to two types of DL CCs. Furthermore, a duty cycle in a DRX pattern may be differently defined with respect to two types of DL CCS. At this time, the same DRX mode as in existing LTE may be applied to the reference DL CCs. Meanwhile, in consideration of importance of the reference DL CCs in terms of the UE, timer values for DRX mode triggering and parameter values for a duty cycle may be adjusted to (adaptively) change the number of times entering DRX mode or circumstances in a sleep state.

As another example, setting of the idle/active states for non-reference DL CCs may be signaled using reference DL CCs in a UE-specific, UE group-specific, or cell-specific way. The non-reference DL CCs may be explicitly or implicitly signaled through the reference DL CCs. For example, the reference DL CCs may designate DL CCs for active/idle (i.e. active/inactive or DRX entrance/quite) state by using a parameter (or a field). Parameter (or field) for indicating the non-reference DL CCs may be separately defined or may be replaced by CC indexes transmitted through a PDCCH. If any one of the idle state and the active state is signaled through the non-reference DL CCs, a parameter (or a field) for indicating the non-reference DL CCs may also indicate states of the corresponding non-reference DL CCs. Meanwhile, the reference DL CCs may further signal information for indicating the states of the non-reference DL CCs. To this end, an additional parameter (field) may be defined or both information indicating the non-reference DL CCs and information indicating states of the non-reference DL CCs may be defined as one parameter (or field).

A bit size of a parameter for designating the non-reference DL CCs may be defined by DL CCs constituting a cell or by DL CCs configured from a cell in terms of a UE. For example, the parameter may be set to a fixed bit size based on configuration of maximum DL CCs of a cell or a maximum value of the numbers of DL CCs which can be configured in a UE. Signaling may be performed dynamically, semi-dynamically, or in an event-trigger form, through L1/L2 control signaling. Signaling may also be performed semi-statically through UE-specific RRC signaling. In some cases, both the DRX mode entrance (setting) and quit (release) may be explicitly signaled. Moreover, only the DRX mode entrance is explicitly set and transition to the active mode from the DRX mode, (i.e. DRX mode release), may be automatically converted according to detection of the paging message as shown in FIG. 7.

Meanwhile, a scheme for setting the active/idle states of the non-reference DL CCs may be applied only when the reference DL CCs are not set to the DRX mode. In other words, the DRX mode is carrier-common with respect to all DL CCs which are set or configured for an UE or all UEs within a cell and may be applied UE-specifically, UE group-specifically, or cell-specifically. If the DRX mode is not applied, an active/idle setting scheme of DL CCs based on signaling for the non-reference DL CCs may be applied. As another example, in a signaling-based active/idle setting scheme of CCs, the active/idle states of the non-reference DL CCs may be signaled irrespective of whether DRX mode of the reference DL CCs is set or not.

If the reference DL CCs and/or non-reference DL CCs are set, a scheme for deviating from the DRX mode through detection of a paging message may be applied to all or some DL CCs. In this case, a paging indication channel transmission time and a paging channel transmission time may be identically set according to types of all DL CCs or each DL CC. However, if a mode starting point of a DRX pattern and a duty cycle are differently set with respect to two types of DL CCs (i.e. reference DL CCs and non-reference DL CCs) (groups), the paging indication channel transmission time and the paging channel transmission time may be set to be different. If different types of DL CCs are set, a DTX mode transition scheme through detection of the paging message may be applied only in a partial type of DL CCs, (e.g. any one of reference DL CCs or non-reference DL CCs) (groups). For example, the reference DL CCs may deviate from the DRX mode based on detection of the paging message and may indicate DRX mode maintenance or DRX mode release (i.e. active mode) of other DL CCs through UE-specific RRC signaling or L1/L2 control signaling, after a fixed time.

As another example, a DRX mode conversion scheme may be applied only to one or more reference DL CCs, and the other DL CCs may automatically enter the DRX mode or may be converted to the active mode from the DRX mode.

Figure 12:
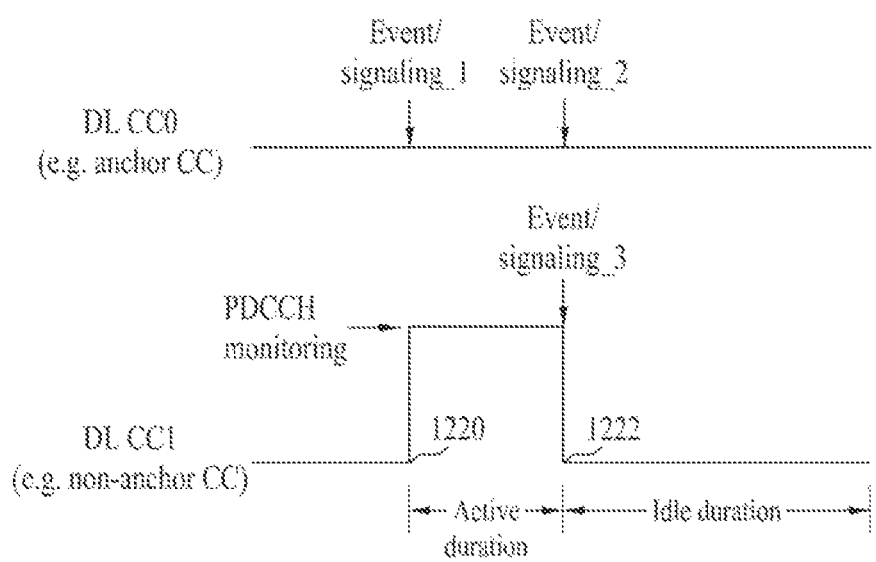
FIG. 12 and FIG. 13 illustrate an operation of a UE according to an embodiment of the present invention.
Figure 13:
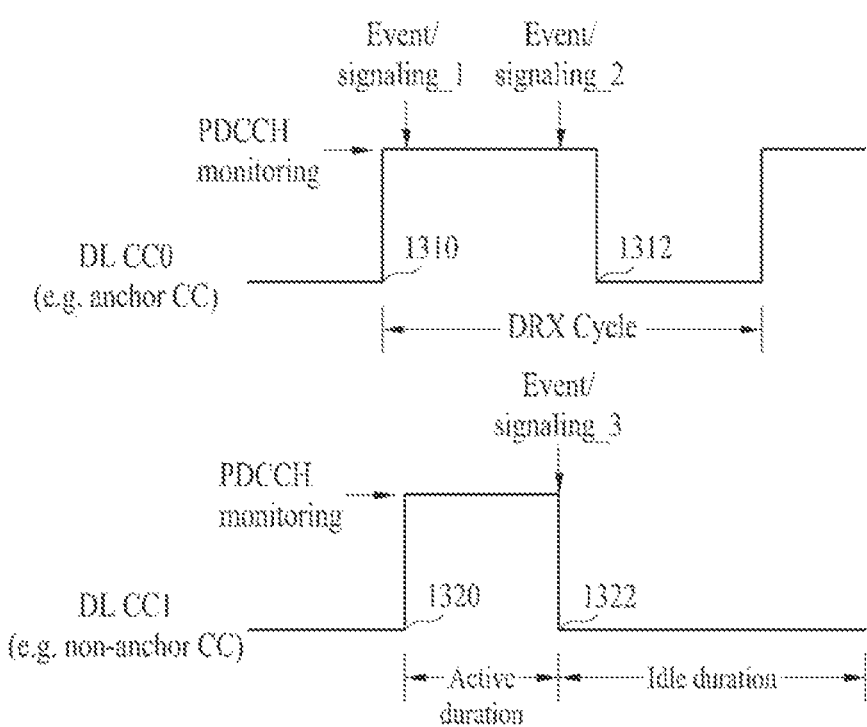

FIG. 12 and FIG. 13 illustrate signaling methods to an active/idle state of a non-reference DL CC according to an embodiment of the present invention. It is assumed that DL CC0 is a reference DL CC (i.e. anchor DL CC), and DL CC1 is a non-reference DL CC (i.e. non-anchor DL CC). It is assumed that DL CC0 is in an active state in FIG. 12 and DL CC1 operates as DRX mode in FIG. 13. In FIG. 13, a DRX cycle and pattern may have various values.

Referring to FIG. 12 and FIG. 13, a UE receives event/signaling_1 for DL CC1 while monitoring DL CC0. The event/signaling_1 may include a parameter for indicating the DL CC1 and information for converting the DL CC1 into an active state. The event/signaling_1 include conversion of the DL CC0 into awake of DRX mode (1310). A UE checks the event/signaling_1 on the DL CC0 and monitors a PDCCH of the DL CC1 (1220 and 1320).

Next, the UE may confirm event/signaling_2 on the DL CC0. The event/signaling_2 may include a parameter for indicating the DL CC1 and information for converting the DL CC1 into an idle state. The event/signaling_1 includes conversion of the DL CC0 into sleep of the DRX mode (1312). The UE may check event/signaling_3 on DL CC1. The event/signaling_3 includes a timer expiration value for conversion into the idle state and explicit and implicit signaling for converting the DL CC1 into the idle state. Upon confirming the event/signaling_2 or event/signaling_3, the UE converts the DL CC1 into the idle state (1222 and 1322) and stops monitoring for a PDCCH of the DL CC1.

Figure 14:
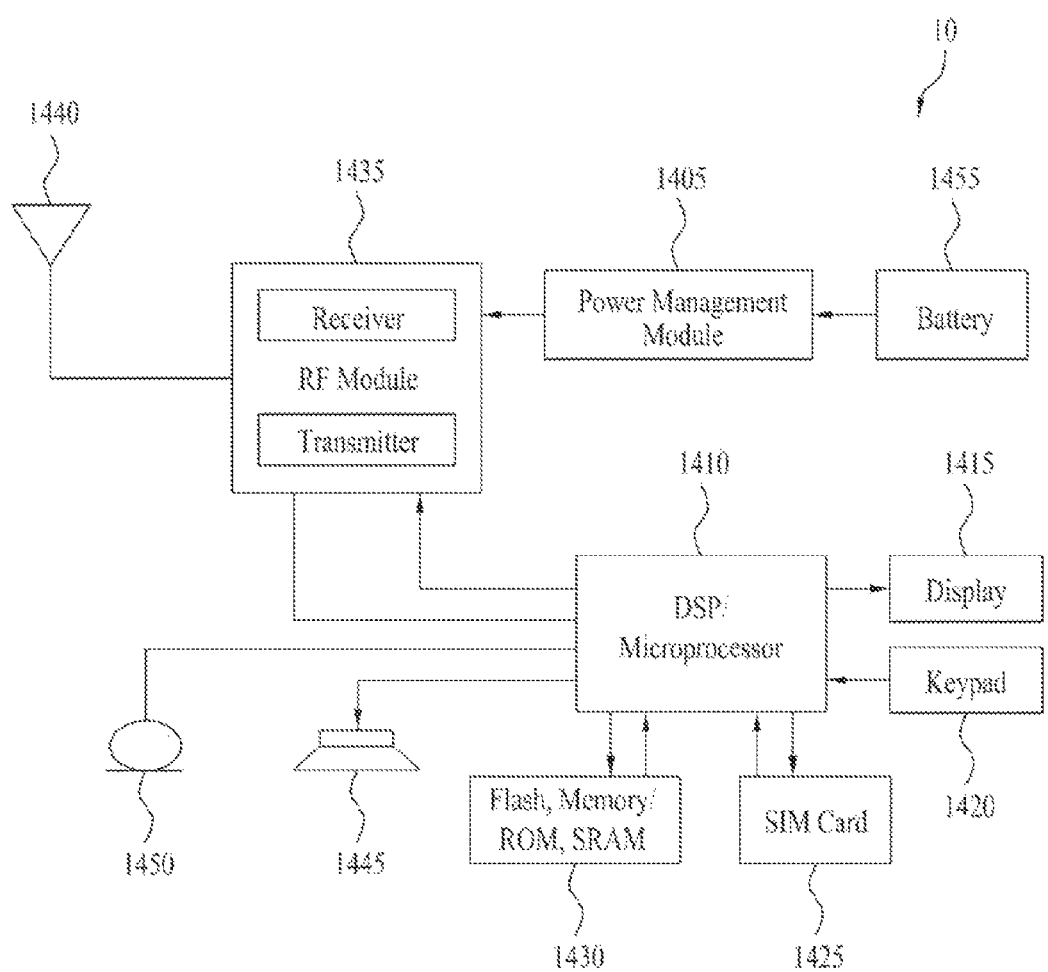
FIG. 14 illustrates a block diagram of a UE according to the present invention.

FIG. 14 illustrates a block diagram of a UE 10. The UE 10 includes a processor (or digital signal processor) 1410, an RF module 1435, a power management module 1405, an antenna 1440, a battery 1455, a display 1415, a keypad 1420, a memory 1430, a SIM card (optional) 1425, a speaker 1445, and a microphone 1450.

A user may input information such as telephone numbers by pressing buttons of the keypad 1420 or by voice driving using the microphone 1450. The microprocessor 1410 receives and processes indication information and performs proper functions such as dialing of a telephone number. Operation data may be extracted from the subscriber ID SIM card 1425 or the memory module 1430. The processor 1410 may display indication and operation information on the display 1415 for reference and convenience of a user.

The processor 1410 provides indication information to the RF module 1435 to start communication such as transmission of radio signals including voice communication data. The RF module 1435 includes a receiver and transmitter for receiving and transmitting radio signals. The antenna 1441 facilitates transmission and reception of radio signals. Upon receiving radio signals, the RF module 1435 forwards and converts the signals to baseband frequency signals so as to be processed by the processor 1410. The processed signals are converted into audible and readable information and are generated through, for example, the speaker. The processor 1410 includes protocol and functions necessary for performing various processing described in this specification.

The above-described embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. It is apparent in the appended claims that claims which are not explicitly dependent on each other may be combined to provide the embodiments or new claims may be added through amendment after this application is filed.

In this document, the embodiments of the present invention have been described based mainly on data transmission and reception between a base station and a user equipment. A specific operation which is described as being performed by the base station may be performed by an upper node of the base station. In other words, various operations performed for communication with the user equipment in the network which includes a plurality of network nodes along with the base station may be performed by the base station or network nodes other than the base station. The base station may be replaced with term such as fixed station, Node B, eNode B (eNB), an access point, etc. Also, the user equipment may be replaced with term such as Mobile Station (MS), Mobile Subscriber Station (MSS), etc.

The embodiments according to the present invention can be implemented by various means, for example, hardware, firmware, software, or combinations thereof. In case of hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In case of firmware or software configuration, the method according to the embodiments of the present invention may be implemented by a type of a module, a procedure, or a function, which performs functions or operations described above. For example, software code may be stored in a memory unit and then may be executed by a processor. The memory unit may be located inside or outside the processor to transmit and receive data to and from the processor through various well known means.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein.

INDUSTRIAL APPLICABILITY

The present invention may be applied to wireless communication systems. Specifically, the present invention may be applied to a method and apparatus used in a wireless communication system supporting carrier aggregation.

The invention claimed is:

1. A method of performing power management at a user equipment (UE) in a wireless communication system, the method comprising:
  configuring, by the UE, a Discontinuous Reception (DRX) cycle, the DRX cycle including a DRX ON duration and a DRX opportunity,
  wherein the same DRX ON duration is applied to all of two or more activated component carriers, the two or more activated component carrier including a primary component carrier and at least one activated non-primary component carrier assigned to the UE; and
  performing, by the UE, Physical Downlink Control CHannel (PDCCH) monitoring for each of the two or more activated component carriers during the DRX ON duration of every DRX cycle,
  wherein non-primary component carrier activation/deactivation is indicated using a field of Layer 1 (L1) or Layer 2 (L2) control information, the field having a fixed bit size regardless of a number of configured component carriers.

2. The method of claim 1, wherein the PDCCH monitoring is not performed for the two or more activated component carriers during the DRX opportunity.

3. The method of claim 1, further comprising:
  configuring the at least one activated non-primary component carriers to a deactivated state; and
  receiving state change information for the deactivated at least one non-primary component carriers through a PDCCH of the activated primary component carrier while the at least one non-primary component carrier is in the deactivated state.

4. The method of claim 3, wherein the deactivated at least one non-primary component carrier is activated in response to detection of corresponding paging indication information or a corresponding paging message on the activated primary component carrier.

5. The method of claim 4, wherein the deactivated at least one non-primary component carrier is activated when the state change information of the PDCCH on the activated primary component carrier indicates a predetermined value.

6. The method of claim 1, further comprising:
  performing a function, by the UE, based on the monitoring.

7. The method of claim 6, wherein the function comprises one of:
  receiving data via one of the two or more activated component carriers;

transmitting data via one of the two or more activated component carriers; and performing power control.

8. A user equipment configured to perform power management in a wireless communication system, the user equipment comprising:

a Radio Frequency (RF) module; and a processor, wherein the processor is configured to:

configure a Discontinuous Reception (DRX) cycle, the DRX cycle including a DRX ON duration and a DRX opportunity, wherein the same DRX ON duration is applied to all of two or more activated component carriers, the two or more activated component carrier including a primary component carrier and at least one activated non-primary component carrier assigned to the UE; and perform Physical Downlink Control CHannel (PDCCH) monitoring for each of the two or more activated component carriers during the DRX ON duration of every DRX cycle, wherein non-primary component carrier activation/deactivation is indicated using a field of Layer 1 (L1) or Layer 2 (L2) control message, the field having a fixed bit size regardless of a number of configured component carriers.

9. The user equipment of claim 8, wherein the PDCCH monitoring is not performed for the two or more activated component carriers during the DRX opportunity.

10. The user equipment of claim 8, wherein the processor is further configured to:

configure the at least one activated non-primary component carriers to a deactivated state; and receive state change information for the deactivated at least one non-primary component carrier through a PDCCH of the activated primary component carrier while the at least one non-primary component carriers are in the deactivated state.

11. The user equipment of claim 10, wherein the deactivated at least one non-primary component carrier is activated in response to detection of corresponding paging indication information or a corresponding paging message on the activated primary component carrier.

12. The user equipment of claim 11, wherein the deactivated at least one non-primary component carrier is activated when the state change information of the PDCCH on the activated primary component carrier indicates a predetermined value.

13. The user equipment of claim 8, wherein the processor is further configured to perform a function based on the monitoring.

14. The user equipment of claim 13, wherein the function comprises one of:

receiving data via one of the two or more activated component carriers;

transmitting data via one of the two or more activated component carriers; and performing power control.

* * * * *